United States Patent
Ganzhorn et al.

(10) Patent No.: US 12,246,773 B2
(45) Date of Patent: Mar. 11, 2025

(54) FASTENING ARRANGEMENT OF AN INTEGRAL SUPPORT ON A BODY FOR A PASSENGER MOTOR VEHICLE AS WELL AS PASSENGER MOTOR VEHICLE

(71) Applicant: Mercedes-Benz Group AG, Stuttgart (DE)

(72) Inventors: Regina Ganzhorn, Sindelfingen (DE); Niels Ole Dittmer, Altensteig (DE); Robert Murmann, Gerlingen (DE)

(73) Assignee: Mercedes-Benz Group AG, Stuttgart (DE)

( * ) Notice: Subject to any disclaimer, the term of this patent is extended or adjusted under 35 U.S.C. 154(b) by 337 days.

(21) Appl. No.: 17/926,405

(22) PCT Filed: Mar. 29, 2021

(86) PCT No.: PCT/EP2021/058126
§ 371 (c)(1),
(2) Date: Nov. 18, 2022

(87) PCT Pub. No.: WO2021/233600
PCT Pub. Date: Nov. 25, 2021

(65) Prior Publication Data
US 2023/0182821 A1    Jun. 15, 2023

(30) Foreign Application Priority Data
May 19, 2020    (DE) .............. 10 2020 003 013.0

(51) Int. Cl.
*B62D 21/15*    (2006.01)
*B62D 25/20*    (2006.01)
(Continued)

(52) U.S. Cl.
CPC ....... *B62D 21/155* (2013.01); *B62D 25/2018* (2013.01); *B60K 1/04* (2013.01);
(Continued)

(58) Field of Classification Search
CPC .. B62D 21/155; B62D 25/2018; B62D 25/08; B62D 27/02; B62D 21/11; B60K 1/04; B60K 2001/0438
(Continued)

(56) References Cited

U.S. PATENT DOCUMENTS 6,203,099 B1    3/2001  Iwatsuki
8,833,838 B2 *  9/2014  Watanabe ............ B62D 21/152
                                          296/203.02
(Continued)

FOREIGN PATENT DOCUMENTS

DE        699 22 561 T2      5/2005
DE   20 2011 000 514 U1      8/2012
(Continued)

OTHER PUBLICATIONS

PCT/EP2021/058126, International Search Report dated Jun. 23, 2021 (Two (2) pages).
(Continued)

*Primary Examiner* — Amy R Weisberg
*Assistant Examiner* — Dana D Ivey
(74) *Attorney, Agent, or Firm* — Crowell & Moring LLP

(57) ABSTRACT

A fastening arrangement for a passenger motor vehicle includes an integral support fastened to longitudinal supports of a body of the passenger motor vehicle that are distanced from each other in a transverse direction of the passenger motor vehicle and are disposed above the integral support. An electrical energy store is disposed behind the integral support in a longitudinal direction of the passenger motor vehicle. The integral support has a step on an end that faces the electrical energy store where an upper support surface and a lower support surface are formed by the step. The upper support surface is disposed opposite a crossmember of the body in the longitudinal direction of the passenger
(Continued)

motor vehicle and the lower support surface is disposed opposite a support element of the electrical energy store in the longitudinal direction of the passenger motor vehicle.

11 Claims, 5 Drawing Sheets

(51) Int. Cl.
  *B60K 1/04* (2019.01)
  *B62D 21/11* (2006.01)
  *B62D 25/08* (2006.01)
  *B62D 27/02* (2006.01)
(52) U.S. Cl.
  CPC ...... *B60K 2001/0438* (2013.01); *B62D 21/11* (2013.01); *B62D 25/08* (2013.01); *B62D 27/02* (2013.01)
(58) Field of Classification Search
  USPC .......................................................... 296/204
  See application file for complete search history.

(56) References Cited

U.S. PATENT DOCUMENTS

| 2020/0010123 A1* | 1/2020 | Fujii ...................... B62D 21/02 |
| 2020/0017146 A1 | 1/2020 | Tomizawa et al. |

FOREIGN PATENT DOCUMENTS

| DE | 10 2012 220 871 A1 | 6/2014 |
| DE | 10 2016 109 912 A1 | 1/2017 |
| DE | 10 2015 016 492 A1 | 6/2017 |
| DE | 10 2018 205 171 A1 | 10/2019 |
| EP | 3 590 792 A1 | 1/2020 |
| JP | 8-282534 A | 10/1996 |

OTHER PUBLICATIONS

German-language German Office Action issued in German application No. 10 2020 003 013.0 dated Dec. 10, 2020 (Six (6) pages).

* cited by examiner

FASTENING ARRANGEMENT OF AN INTEGRAL SUPPORT ON A BODY FOR A PASSENGER MOTOR VEHICLE AS WELL AS PASSENGER MOTOR VEHICLE

BACKGROUND AND SUMMARY OF THE INVENTION

The invention relates to a fastening arrangement of an integral support on a body for a passenger motor vehicle. Furthermore, the invention relates to a passenger motor vehicle.

A fastening arrangement of an integral support of this kind, on a body for a passenger motor vehicle, is known from DE 10 2018 205 171 A1. In the fastening arrangement, the integral support, which is also referred to as the support frame, front axle support, suspension sub-frame, axle sub-frame or motor support is fastened to longitudinal beams of the body, which are distanced from each other in the transverse direction of the vehicle and are arranged above the integral support in the vertical direction of the vehicle. An electrical energy store is also arranged behind the integral support in the longitudinal direction of the vehicle, the energy store also being arranged underneath a floor of the body in the vertical direction of the vehicle. The electrical energy store is also fastened or held onto the body here.

Furthermore, a front axle support for a motor vehicle, which has two longitudinal supports on which suspension points for a front wheel suspension are formed, is indicated in DE 10 2012 220 871 A1.

It is the object of the present invention to create a fastening arrangement of an integral support on a body for a passenger motor vehicle as well as such a passenger motor vehicle, so that especially advantageous crash behavior can be implemented.

In the fastening arrangement according to the invention, an integral support is fastened on a self-supporting body for a passenger motor vehicle. The body here has two longitudinal supports, also referred to as main longitudinal supports (Hauptlängsträger, HLT), which are distanced from each other in the transverse direction of the vehicle, and which are arranged above the integral support in the vertical direction of the vehicle. The integral support, also referred to as the auxiliary frame, front axle support, suspension sub-frame, axle sub-frame, or motor support, is fastened to the longitudinal supports here. Furthermore, in the fastening arrangement, an electrical energy store is arranged behind the integral support in the longitudinal direction of the vehicle, in or by means of which electrical energy or electrical power can be stored. The energy store is arranged underneath a floor of the body in the vertical direction of the vehicle, the floor of which at least partially, in particular at least predominantly or completely delimits a passenger space of the passenger motor vehicle, also referred to as an interior or passenger compartment, at the bottom in the vertical direction of the vehicle. The energy store is at least partially, in particular at least predominantly or completely covered by the floor at the top in the vertical direction of the vehicle. In the fastening arrangement, the energy store is also fastened to the floor.

In order to now be able to achieve especially advantageous crash behavior of the passenger motor vehicle, it is provided according to the invention that the integral support has at least one step on its end that faces the energy store, by means of which at least one upper support surface A1 and one lower support surface A2 are formed, wherein the upper support surface A1 is arranged opposite a crossmember of the body, which is arranged under the floor, in the longitudinal direction of the vehicle and the lower support surface A2 is arranged opposite a support element of the energy store, which is arranged under the floor, in the longitudinal direction of the vehicle.

It should be noted that the crossmember of the body, which is arranged under the floor and is thus in particular covered by the floor at the top in the vertical direction of the vehicle, is at least partially, in particular at least predominantly or completely covered by the support surface A1 of the integral support in the longitudinal direction of the vehicle. Since the crossmember is a component of the body, the crossmember is also referred to as the body crossmember. The support surfaces are also arranged offset from each other in the longitudinal direction of the vehicle in such a way that it is provided in a preferred exemplary embodiment that the second, lower support surface is arranged lower in the longitudinal direction of the vehicle compared to the first, upper support surface. The support element of the energy store, which is arranged under the floor in the vertical direction of the vehicle and is thus for example covered by the floor at the top in the vertical direction of the vehicle, is at least partially, in particular at least predominantly or completely covered by the lower support surface towards the front in the longitudinal direction of the vehicle.

In a preferred exemplary embodiment, the integral support has a curved structure which is thus formed in a curve, in particular as a circular segment, at least in a section. The curved structure is in particular, at least in the mentioned section, formed in the manner of the Greek capital letter Omega ($\Omega$) and is thus omega-shaped, wherein for example the curved structure in itself has two legs with respective ends, which are in particular free in themselves. The integral support also has two front support beams, i.e., arranged in front of the curved structure in the longitudinal direction of the vehicle, which extend forwards in the longitudinal direction of the vehicle, away from the curved structure in itself. The support beams also run diagonal to each other, so that the support beams extend forwards in the longitudinal direction of the vehicle, away from each other. This means that the support beams extend at least generally in a V-shape in such a way that the support beams extend together in the longitudinal direction of the vehicle from the front to the back and thus in the direction of the curved structure. The integral support furthermore comprises a front integral support crossmember, i.e., arranged in front of the curved structure in the longitudinal direction of the vehicle, which is distanced from the curved structure, in particular from its vertex, in the longitudinal direction of the vehicle. This means that the integral support crossmember does not affect the curved structure. The support beams are connected to each other by means of the integral support crossmember, in particular in such a way that the integral support crossmember is in itself connected to the support beams by means of its free end.

The support element, also referred to as the energy store support element, is for example a holding frame, in particular a battery module holding frame or a housing, which accommodates a battery or cell modules or storage cells to store the electrical energy. In other words, it can be provided that the support element is a housing in which several storage cells of the energy store are arranged, wherein electrical energy can be stored or is stored by means of the storage cells or in the storage cells. By means of the support surfaces and because the integral support is connected to the main longitudinal supports that are arranged above it, several load paths can form per support beam of the integral support in a frontal crash, i.e., in a head-on collision of the passenger motor vehicle, the respective support beams of the integral support also being referred to as longitudinal support elements. Crash or accident forces that occur in such a frontal crash and in particular act in the longitudinal direction of the vehicle from front to back are introduced into the body or into its bodywork structure via a first of the load paths, wherein the first load path extends at least over a respective part of the respective support beam and over at least one of the attachment points provided on the respective main longitudinal beam, on or in which the integral support is connected to the respective main support beam. This means that at least part of the crash force is directed from the integral support into the respective main longitudinal support and thus into the body. At least a part of the accident force is introduced via a second of the load paths, by means of the integral support and by means of its first, front and upper support surface, into the crossmember under the floor and thus into the bodywork structure. The third load path comprises the second, preferably lower and in particular rear support surface, so that at least a part of the accident force is introduced via the third load path, via this lower support surface into the energy support element and from there into the body, in particular because the energy store, in particular the energy store support element, is fastened, i.e., connected, to the body. Therefore, at least almost all attachment points at or in which the integral support is connected to the body are at least substantially unburdened according to the invention. It is especially advantageous that the accident forces are introduced to the different load paths in the bodywork structure, so that the load acting on the support element and thus the danger of damage to the energy store can be kept low.

In an advantageous embodiment of the invention, the integral support is fastened at its top in the vertical direction of the vehicle to the body crossmember in the area of the support surfaces, in particular between the support surfaces in the longitudinal direction of the vehicle, and is in particular screwed onto the body crossmember. An especially advantageous introduction of the accident forces into the bodywork structure can thereby be achieved by the integral support, so that excessive loads on the energy store can be avoided.

In order to be able to achieve an especially advantageous and in particular direct dissipation of the accident forces into the body via the integral support, it is provided in an embodiment of the invention that the front, upper support surface rests directly on the crossmember, towards the back in the longitudinal direction of the vehicle. Alternatively, it can be provided that the upper support surface is arranged at a distance from the crossmember, whereby position and component tolerances can be compensated for, and that, in the event of a crash, in a corresponding deformation of the front end of the vehicle, this leads to the arrangement of the support surface on the crossmember and thus to the load being applied to the body via this connecting point.

It has furthermore revealed itself to be especially advantageous if the lower support surface—additionally or alternatively to the upper support surface—is distanced from a support element in the longitudinal direction of the vehicle. Excessive loads on the energy store can thereby be avoided and thus the danger of damage to the energy store is kept especially low. It is preferably provided that no further component provided in addition to the integral support and in addition to the energy store is arranged between the rear, lower support surface and the support element of the energy store. It can in particular be provided that an air gap is arranged between the lower support surface and the support element in the longitudinal direction of the vehicle.

A further embodiment is characterized in that the body crossmember is connected on its end to respective side sills of the body, which are distanced from each other in the transverse direction of the vehicle. An especially advantageous degree of rigidity can thereby be embodied, so that the accident force can be especially advantageously dissipated or supported.

In order to, for example, be able to keep the danger of damage to the energy store especially low, it is conceivable that the energy store, in particular its storage cells, is arranged between the side sills in the transverse direction of the vehicle. This can in particular be understood to mean that the energy store, in particular its storage cells, is at least partially, in particular at least predominantly or completely covered by the side sills on both sides, on the outside in the transverse direction of the vehicle.

In order to be able to protect the energy store especially well from excessive stress, it is provided in further embodiments of the invention that the support element is fastened, in particular directly, to the crossmember.

In an especially advantageous embodiment of the invention, the integral support has a further, rear integral support crossmember, which is thus arranged behind the front integral support crossmember in the longitudinal direction of the vehicle. The respective legs of the curved structure, in particular the previously mentioned ends of the legs that are free in themselves, are connected to each other via the rear integral support crossmember. An especially high level of rigidity can thus be achieved.

Finally, it has been shown to be especially advantageous if the support beams themselves are connected directly to the curved structure by means of their respective ends that face the curved structure. What is in particular to be understood here is that the curved structure is not or is only in small part arranged between the support beams, so that preferably at least a majority part of the curved structure is arranged outside the support beams or behind them in the longitudinal direction of the vehicle. Especially advantageous crash behavior can thereby be embodied.

The integral support, also referred to as the support frame, is preferably a front axle support on which, for example, the wheel driver can be or is flexibly fastened for the operation of the vehicle wheels. In order to attach the integral support to the main longitudinal support and thus achieve the support surface, the integral support has, for example, structures by means of which the previously described load paths can be achieved. These structures and thus the load paths make it possible to be able to dissipate particular accident forces especially advantageously in the bodywork structure both in a frontal impact, also referred to as a frontal crash, as well as in a frontal impact with little side impact and in a so-called pole impact, also referred to as a pole crash, whereby especially advantageous crash behavior can be achieved. The integral support can in general be used in order to support a drive motor for powering the passenger motor vehicle that is, for example, formed as an internal combustion engine or, alternatively, as an electric motor. However, the integral support is then also especially advantageous if there is not a drive motor that is supported on the integral support and thus for example there is not a drive motor in a front of the passenger motor vehicle. The integral support, which is for example formed as a front axle support, can then also advantageously direct and for example also absorb accident energy, if the front of the vehicle has no drive motor.

A passenger motor vehicle having at least one fastening arrangement according to the invention is also part of the invention. Advantages and advantageous embodiments of the fastening arrangement according to the invention can be seen as advantages and advantageous embodiments of the passenger motor vehicle according to the invention and vice versa.

Further advantages and details of the invention arise from the following description as well as based on the drawings.

DETAILED DESCRIPTION OF THE DRAWINGS

Figure 1:
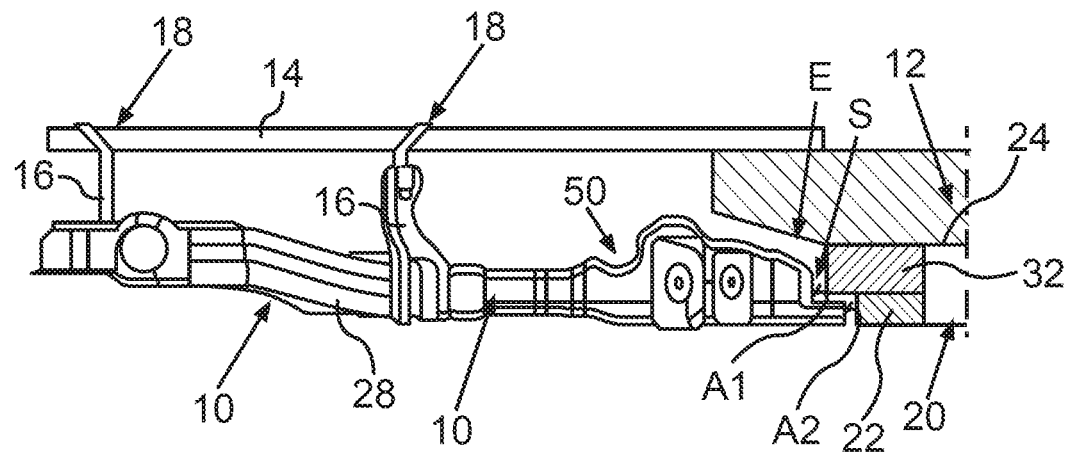
FIG. 1 is a sectional, schematic and partially cut side view of an integral support on a body for a passenger motor vehicle.

In the figures, identical or functionally identical elements are provided with the same reference numerals.

FIG. 1 shows a fastening arrangement of an integral support 10 on a self-supporting body 12 of a passenger motor vehicle, in a sectional, schematic and partially cut side view. In the exemplary embodiment shown in the figures, the integral support 10 is an axle support, also referred to as a support frame, in particular a front axle support, to which an axle of the passenger motor vehicle can be attached or is attached, the axle not being shown in the figures, and being in particular a front axle. To this end, respective wheel drivers are, for example, flexibly fastened or can be flexibly fastened to the integral support 10 for the operation of the vehicle wheels of the passenger motor vehicle.

In the fastening arrangement, the integral support 10 that is formed separately to the self-supporting body 12 is arranged under longitudinal supports of the body 12 in the vertical direction of the vehicle (z-direction in the vehicle coordinate system), the longitudinal supports being distanced from each other in the transverse direction of the vehicle (y-direction in the vehicle coordinate system). The longitudinal supports of the body 12 that are arranged above the integral support 10 in the vertical direction of the vehicle can be recognized in FIG. 1 as the longitudinal support to the left in the transverse direction of the vehicle, relative to the forward direction of the passenger motor vehicle labelled with 14 in FIG. 1.

Here, the integral support 10 for example has, in particular per longitudinal support 14, at least two exactly two fastening elements 16, which are arranged following each other and distanced from each other in the longitudinal direction of the vehicle. The integral support 10 is fastened to respective fastening points 18 of the longitudinal support 14, which are distanced from each other in the longitudinal direction of the vehicle (x direction in the vehicle coordinate system) and are also referred to as attachment points, via the fastening elements 16. Several attachment points in the form of the fastening points 18 are thus provided on the longitudinal support 14, on or by means of which the integral support 10 is fastened to the respective longitudinal support 14.

An electrical energy store 20 of the passenger motor vehicle is arranged in an area near the passenger compartment behind the integral support 10 in the longitudinal direction of the vehicle, in particular in such a way that the energy store 20 is at least partially covered or overlapped by the integral support 10 towards the front in the longitudinal direction of the vehicle. Electrical energy or electricity can be stored in the electrical energy store 20. The energy store 20 is preferably traction storage. This is in particular to be understood to mean that the passenger motor vehicle has at least one electric motor, by means of which the passenger motor vehicle can be electrically powered. The electric motor is thus also referred to as a traction motor. In order to electrically power the passenger motor vehicle by means of the electric motor, the electric motor is operated in a motor operation and thus as an electric motor. The electric motor is therefore supplied with electrical energy stored in the energy store 20.

The energy store 20 has a support element 22, which is formed as a housing in the exemplary embodiment shown in the figures. In particular, then, if the energy store 20 is formed as a battery, in particular as a high-voltage battery (HV battery), then the housing 22 is also referred to as the battery housing. Several storage cells of the energy store 20 are preferably arranged in the housing 22, in which electrical energy can be stored. Here, the storage cells are connected, for example electrically, with each other. As is explained in still more detail in the following, the energy store 20 is fastened to the body 12, which is also referred to as the shell or bodywork support structure. Since the integral support 10 is connected to the longitudinal support of the body 12, also referred to as the main longitudinal support, in particular by means of the fastening elements 16, the integral support 10 is also fastened to the body 12. The body 12 furthermore has a floor 24, also referred to as the main floor, via which the passenger compartment of the passenger motor vehicle, also referred to as the passenger space or interior, is at least partially delimited or sealed off from the road at the bottom in the vertical direction of the vehicle. The energy store 20 and thus the support element 22 are arranged under the floor 24 in the vertical direction of the vehicle, in particular in such a way that the energy store 20 and in particular the support element 22 are covered at least partially by the floor 24 at the top in the vertical direction of the vehicle.

In order to now be able to achieve especially advantageous crash behavior of the passenger motor vehicle, in particular in the event of a frontal impact with complete or alternatively even only partial impact, the integral support 10 is—as is especially clearly recognizable when looking at FIGS. 2 to 5 together—a curved structure 26, which is formed at least substantially in an Ω (omega) shape in the exemplary embodiment shown in the figures, i.e., in the shape of the Greek letter omega. The integral support 10 also comprises two front support beams 28, which extend to the front of the curved structure 26 and away from each other in the longitudinal direction of the vehicle, which are attached to the upper longitudinal support 14 via the fastening elements 16. The support beams 28, which are also referred to as longitudinal support elements of the integral support 10, extend so far outwards and away from each other in the transverse direction of the vehicle that the support beams 28 end further out in the transverse direction of the vehicle than the curved structure 26. The integral support 10 also comprises a front integral support crossmember 30 that is fully distanced from the curved structure 26 in the longitudinal direction of the vehicle, which is connected to the support beams on its respective ends, in particular on their ends. The support beams 28 are thereby connected to each other via the integral support crossmember 30.

Furthermore, the integral support 10 has respective steps S, that are distanced from each other in the transverse direction of the vehicle, on its ends E that face the energy store 20 in the longitudinal direction of the vehicle, and point backwards in the longitudinal direction of the vehicle. A respective front and upper support surface A1 is formed by the respective steps S, by means of which a respective section of a crossmember 32 arranged under the floor 24 in the vertical direction of the vehicle is covered by the body 12 to the front in the longitudinal direction of the vehicle. Furthermore, a lower and rear support surface A2, which is arranged displaced from the first support surface in both the vertical direction of the vehicle and in the longitudinal direction of the vehicle, is formed by the step S. The support surface A2 is arranged further back in the longitudinal direction of the vehicle than the support surface A1. The support surface A2 is also arranged further down in the vertical direction of the vehicle than and nearer to the road than the support surface A1. A respective section of the support element 22 is covered by the rear lower support surface A2 towards the front in the longitudinal direction of the vehicle. The integral support 10 thus is or can be supported, in particular respectively directly, by the support surface A1 towards the back of the crossmember 32 in the longitudinal direction of the vehicle and by the support surface A2 towards the back of the support element 22 in the longitudinal direction of the vehicle, whereby crash forces acting from front to back in the longitudinal direction of the vehicle can be especially advantageously introduced into the body 12. The crash forces can also be introduced into the main longitudinal support and thus into the body 12 via the fastening elements 16 and thus via the fastening points 18.

Overall, it can be recognized that three loads paths can form, in particular per longitudinal support element (support beam 28), if there is a frontal impact of the passenger motor vehicle. A first of the load paths runs over a respective part of the respective support beam 28, over the respective fastening elements 16 and the fastening points 18, into the respective longitudinal support 14, and thus into the body 12. A second of the load paths runs, for example, over the respective support beam 28, the curved structure 26 and the respective front and upper support surface A1 into the crossmember 32 and thus also into body 12, which is also referred to as the bodywork structure. The third load path runs over the respective support beam 28, the curved structure 26 and the respective rear and lower support surface A2 into the support element 22 that is formed on the body 12 or integrated into the body 12 or fastened onto it, and over this also into the body 12. In particular, the integral support 10 can introduce crash forces into the body 12 especially well, via the support surfaces A1 and A2 facing the passenger compartment. The integral support 10 can also introduce crash forces into the main longitudinal support especially advantageously.

Furthermore, it is preferably provided that the integral support 10 is fastened in the area of the support surfaces A1 and A2, in particular between the support surfaces A1 and A2 in the longitudinal direction of the vehicle, at the top on the crossmember 32 in the vertical direction of the vehicle. To this end, the integral support 10 has, in particular per step S, at least one or several fastening elements 34, that are especially clearly visible in FIG. 4, which are herein preferably formed as screw holes, in particular as through-openings. The integral support 10 is screwed against the crossmember 32 or screwed onto the crossmember 32 from bottom to top in the vertical direction of the vehicle on its end E, also referred to as its end area, by means of the fastening elements 34. The support surfaces A1 and A2 run, for example, at least substantially vertically, i.e., parallel to the vertical direction of the vehicle and thus for example perpendicular to the longitudinal direction of the vehicle. A respective third support surface A3 of the respective step S is, for example, arranged between the support surfaces A1 and A2 in the longitudinal direction of the vehicle. The integral support 10 can be or is, in particular directly, supported on the crossmember 32 by the respective support surface A3 at the top in the vertical direction of the vehicle, so that for example the respective support surface A3 is at least partially covered by the crossmember 32 at the top in the vertical direction of the vehicle. The respective support surface A3 here preferably extends perpendicular to the vertical direction of the vehicle and thus, for example, horizontally.

Figure 6:
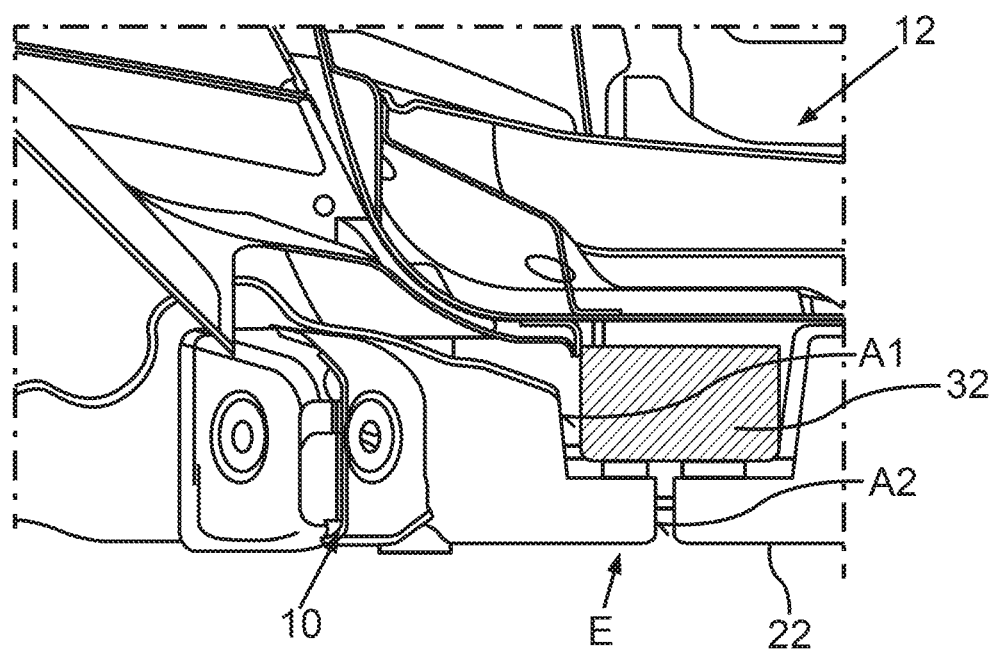
FIG. 6 is a sectional, further schematic and cut side view of the fastening arrangement.

As is in particularly apparent from FIG. 6, the respective upper support surface A1 is arranged at a distance behind the crossmember 32 or in front of the crossmember 32 in the longitudinal direction of the vehicle. Furthermore, the respective lower support surface A2 is also distanced from the support member 22 in the longitudinal direction of the vehicle. The spacing of the two support surfaces A1 and A2 from the crossmember 32 or the support element 22 has the advantage that positional and component tolerances can easily be compensated for. The support surfaces A1 and A2 only come into contact with the crossmember 32 or the support element 22 in the event of a crash, in a corresponding deformation of the front end of the vehicle, so that the load paths are only then established and the crash forces are introduced into the crossmember or the support element 22 via these. Of course it can be provided in an alternative exemplary embodiment of the vehicle that the upper support surface A1 has already been brought into contact with the crossmember 32 during the attachment of the integral support to the vehicle.

It is preferably provided that the crossmember 32 is connected at its end, i.e., via its respective ends, to respective side sills of the body 12, which are distanced from each other in the transverse direction of the vehicle, wherein the support element 22 is preferably also connected to the side sills. It is furthermore conceivable that the support element 22 is fastened to the crossmember 32.

The curved structure 26 has legs 36, which each run in an intrinsically curved shape, are combined and thus together form the shape of the Greek capital letter omega. The integral support 10 has a further, rear integral support crossmember 38, via which the shaft 36 and the curved structure 26, i.e., the omega shape, are connected to each other. The integral support crossmember 38 is in particular a crossbar, which is optionally provided and is in particular used to achieve advantageous acoustic behavior, also referred to as NVH behavior (Noise Vibration Harshness). It is furthermore conceivable that the support element 22 is fastened to body components of the body 12 in addition to the side sills and in addition to the crossmember 32. The only optionally provided crossbar serves, for example, to support the legs 36, in particular in the area of their ends, and thus to support the fastening elements 34, for example formed as a bearing or used as a bearing.

FIG. 6 once again especially clearly shows the support or potential for support of the integral support 10 by the support surfaces A1 and A2 towards the back of the crossmember 32 and the support element 22.

Figure 7:
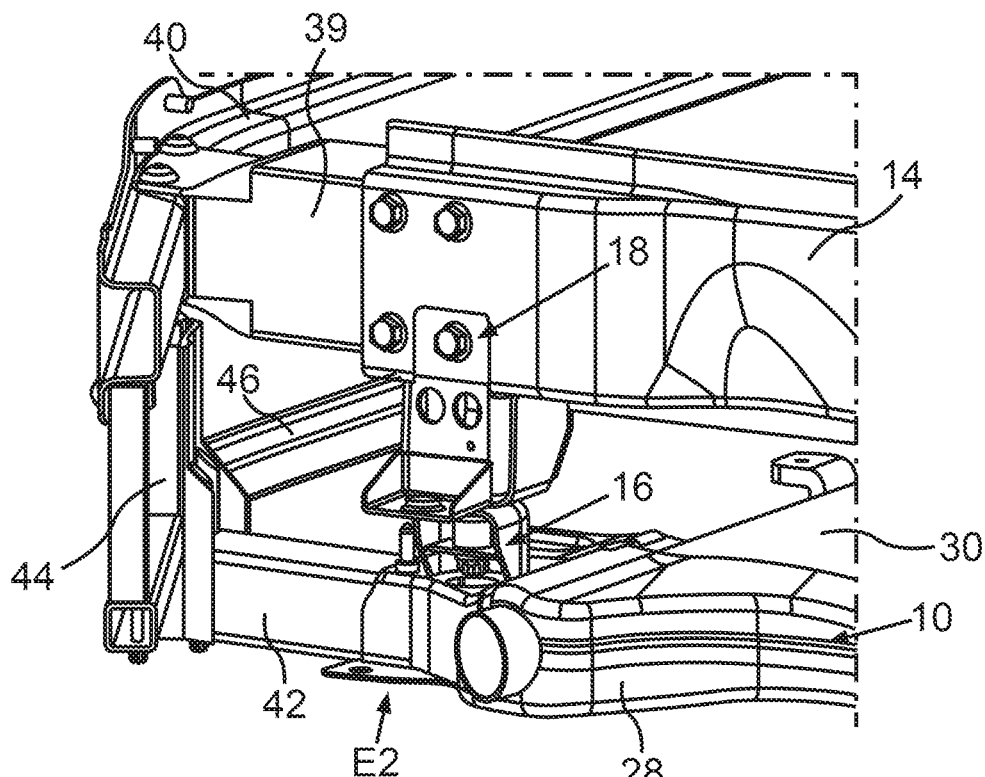
FIG. 7 is a sectional, schematic perspective view of the fastening arrangement.

Using the example of the upper longitudinal support 14, it is especially clearly recognizable in FIG. 7 that the respective main longitudinal support is connected to a respective energy absorption element 39, also referred to as the crash box. The energy absorption elements 39 are in particular deformable in a frontal impact during energy dissipation. The energy absorption elements 39 are connected to each other via a flexible front crossmember 40 that extends at least substantially in the transverse direction of the vehicle, the so-called flexible bumper crossmember, so that the main longitudinal supports are connected to each other at the end via the energy absorption elements 38 by means of the flexible crossmember 40. It is also especially clearly visible in FIGS. 7, 8 and 9 that the respective support beam 28 is connected to the respective further energy absorption element 42 on its respective front end that faces away from the curved structure 26, the further energy absorption element 42 being arranged under the respective energy absorption element 39 in the vertical direction of the vehicle. The energy absorption elements 42 are thereby attached to a front end E2 of the integral support 10 that faces away from the curved structure 26, the front end E2 of which is formed by the support beam 28 or by its ends. The respective energy absorption element 42 is, in turn, attached to a respective vertical strut 44, which extends at least substantially in the vertical direction of the vehicle. The vertical strut 44 that is connected to the respective energy absorption element 42 at one end is connected on the other end with the flexible crossmember 40 that is arranged over the respective energy absorption element 42. The vertical struts 44 that are distanced from each other in the transverse direction of the vehicle and are thus provided on both sides of the passenger motor vehicle area are also connected to each other by means of a transverse element 46. The transverse element 46 is arranged under the flexible crossmember 40 in the vertical direction of the vehicle and is arranged in front of the integral support crossmember 30 in the longitudinal direction of the vehicle.

Figure 8:
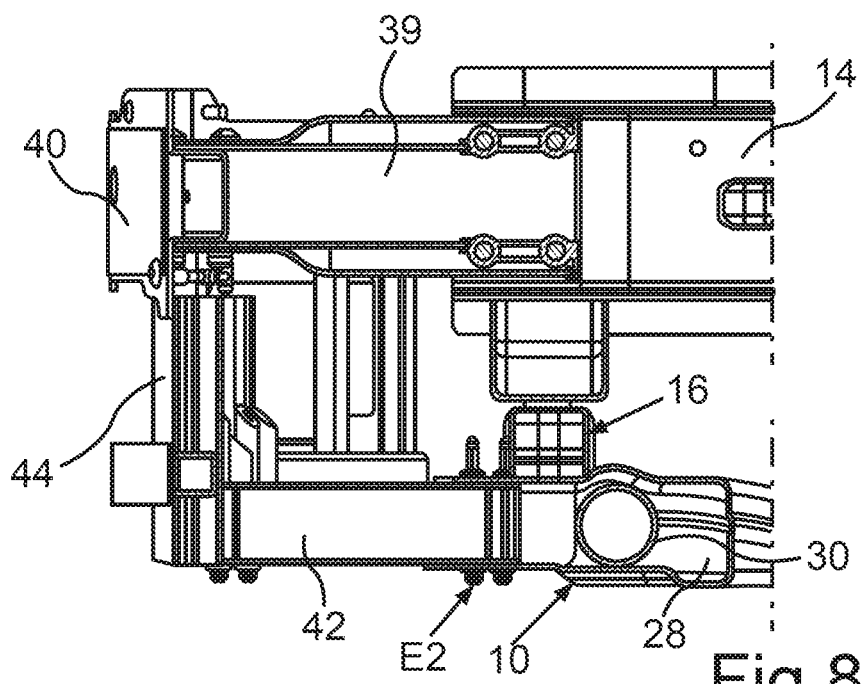
FIG. 8 is a sectional, schematic side view of the fastening arrangement.
Figure 9:
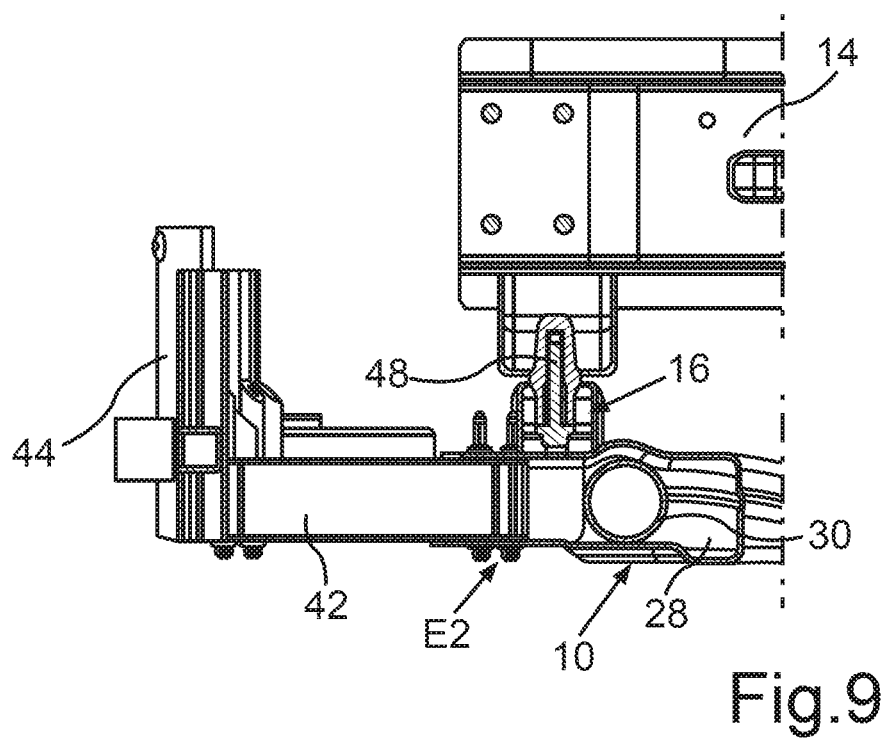
FIG. 9 is a sectional, further schematic and partially cut side view of the fastening arrangement.

The fastening element 16 of the respective support beam 28 that is in front in the longitudinal direction of the vehicle is especially clearly recognizable in FIGS. 7 to 9. Here, the respective support beam 28 is connected to the longitudinal support 14 via the fastening element 16 by means of the additional, separate screw element 48, i.e., screwed against the longitudinal support 14 and thus fastened to the longitudinal support 14.

It is recognizable from FIG. 1 that the respective leg 36 of the curved structure 26 has a respective recess 50 for a rotary rod of a steering system of the passenger motor vehicle. This in particular means that the rotary rod is at least partially arranged in the recess 50. It is recognizable from FIG. 5 that the respective leg 36 has an opening, for example formed as a through-opening, in particular at the height of the optionally provided integral support crossmember 38. A tube can be or is arranged in the opening 52. A screw can be inserted through the opening 52 and in particular through the tube, by means of which the integral support 10 can be screwed against a connection support of an end wall and can thus be fastened to the connection support of the end wall.

Figure 2:
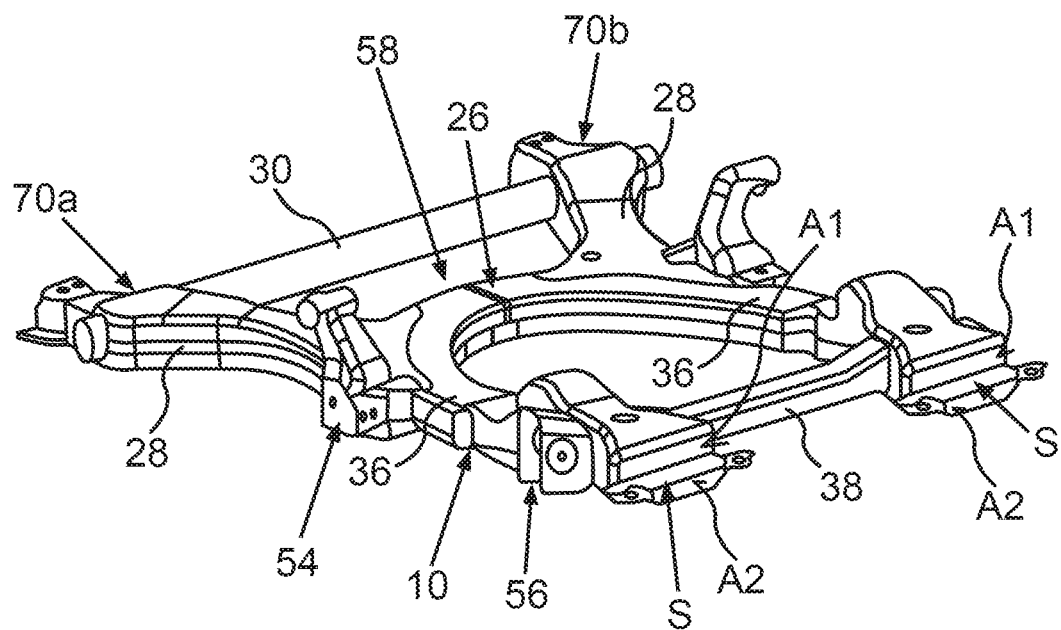
FIG. 2 is a schematic perspective view of the integral support.
Figure 3:
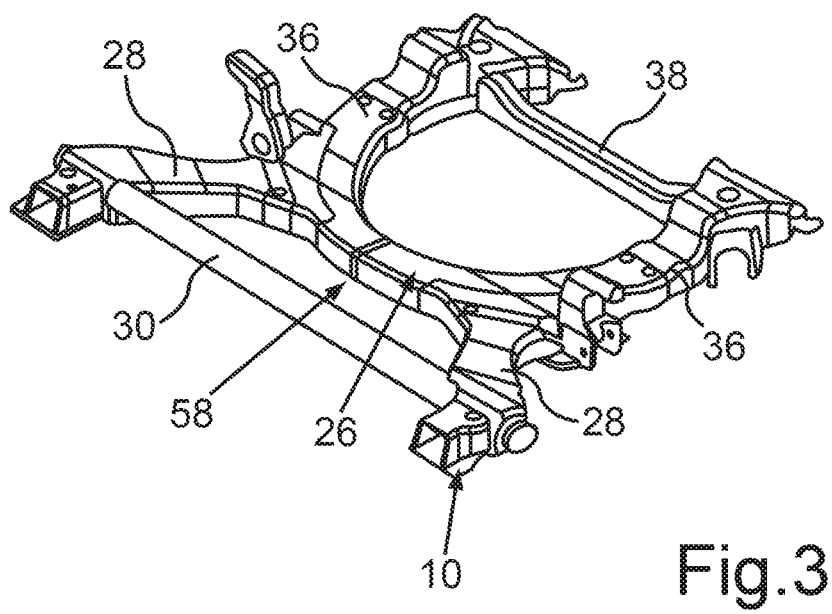
FIG. 3 is a further schematic perspective view of the integral support.
Figure 4:
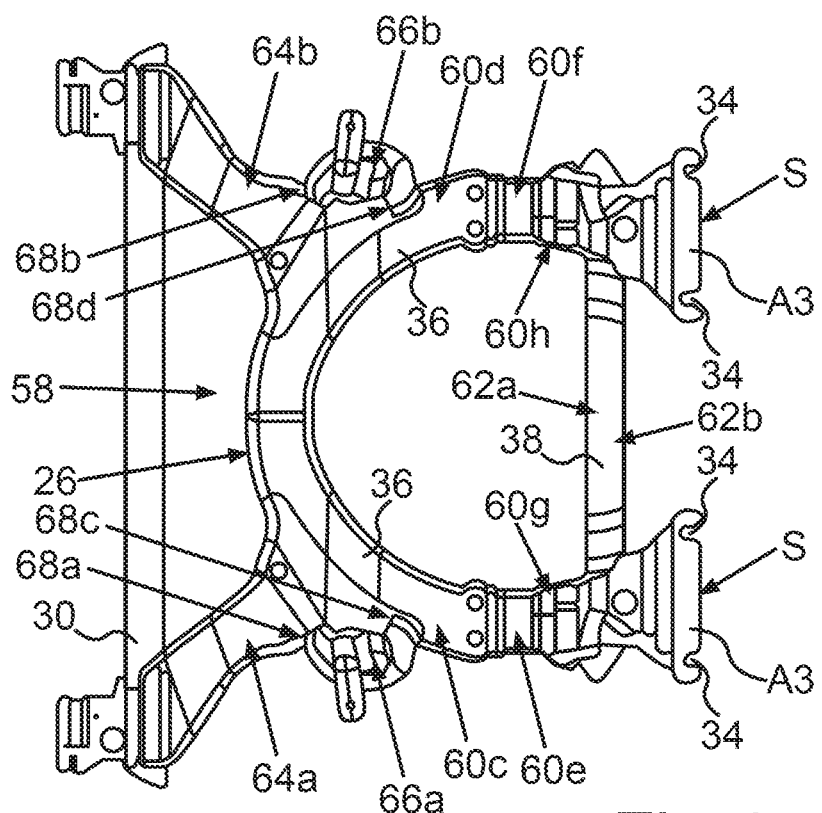
FIG. 4 is a schematic plan view of the integral support.
Figure 5:
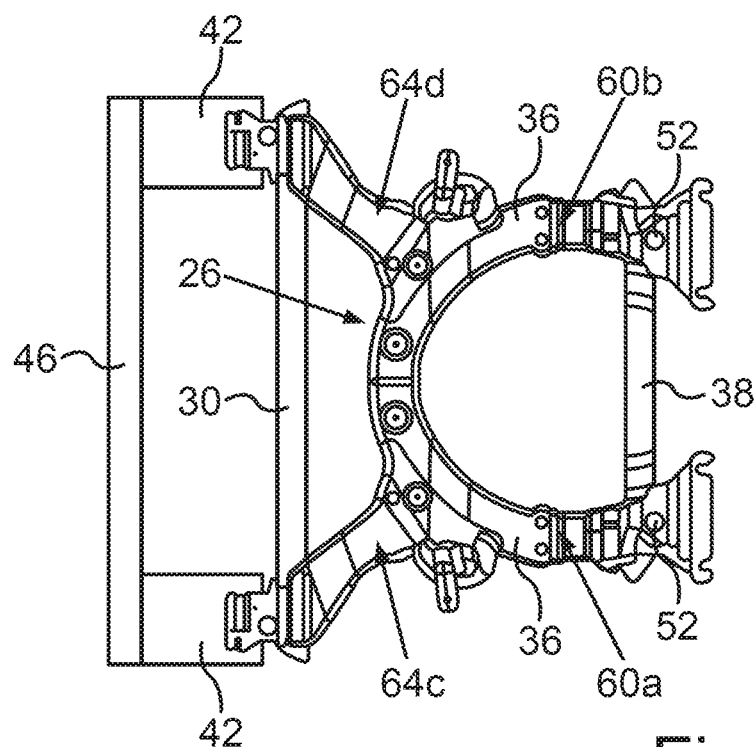
FIG. 5 is a schematic bottom view of the integral support.

It is also recognizable from FIG. 2 that the integral support 10 has respective receiving areas 54 and 56 per leg 36. A crossbar can for example be attached to the integral support 10 via the receiving region 54, and a compression strut can for example be attached to the integral support 10 via the receiving region 56.

The curved structure 26 is an omega-shaped main profile of the integral support 10, which comprises the support beams 28 as connection supports and the integral support crossmembers 30 and 38 as integrated transverse structures. However, in this instance the integral support crossmember 38 is only optionally provided and can be omitted. Since the integral support crossmember 30 is distanced from the curved structure 26 and in particular from its vertex 58 in the longitudinal direction of the vehicle, the integral support crossmember 30 is decoupled from the vertex 58 of the curved structure, also referred to as the omega profile. The integral support crossmember 30 is thereby fastened to the omega profile via the support beam 28. A leverage effect can be achieved for the centre of gravity of the vehicle in the x-y plane by the shear stiffness of the integral support 10, for example in a frontal impact with low lateral impact area against a rigid obstacle. This leverage effect reduces the impact area with the rigid obstacle in an efficient way and thus enables the back of the vehicle structure to slide off the obstacle, also referred to as a barrier. The integral support 10 enables especially advantageous energy absorption. The omega profile (curved structure 26) is formed by several individual shapes 60*a-h*, which are, for example, put together. The individual shapes 60*a-h* can be aligned with each other and, for example, all lie at roughly the same height. The basic shape of the omega profile can be a rectangular shape and can form the vertex 58 in a front area. The steps S with the support surfaces A1 and A2 here allow a positive-fitting support towards the back in the longitudinal direction of the vehicle on neighbouring components, in the form of the crossmember 32 and of the support element 22 of the energy store 20. The rear integral support crossmember 38 itself is, for example, assembled from several individual parts 62*a-b*. The rear integral support crossmember 38 is, for example, at least partially, in particular fully, enclosed by the omega profile. Fastening options can be integrated into neighbouring components on the inherently open ends of the omega profile, in particular of the leg 36. The receiving areas 54 and 56 serve, for example, to receive bearings that can be attached, in particular flexibly, to the integral support 10 via the wheel driver and/or struts. The bearings in particular serve for positioning the components of the previously mentioned axle, in particular of the front axle. The omega profile additionally offers the possibility of resting the rotary rod on the integral support 10 just in front of the rear integral support crossmember 38. To this end, a bearing for positioning the rotary rod can be or is arranged in, for example, the respective recess 50.

The support beams 28, which are, for example, formed separately from the omega profile and are also referred to as connection supports, are connected tightly to the omega profile, in particular by welding. The connection supports extend to the front in the longitudinal direction of the vehicle and to the outside in the transverse direction of the vehicle and protrude far beyond the width of the omega profile. The respective support beam is, for example, assembled from several individual parts 64*a-d*. At a respective protrusion of the respective connection support, in particular in the area of the omega profile, a respective abutment 66*a, b* is connected tightly to the respective connection support, in particular by welding. This connection is preferably secured on three sides, and can be at least substantially U-shaped. The abutments 66a, 66b are tightly connected to the respective connection supports, in particular by welding, for example via further brackets 68a-d. It is ensured by the abutments 66a, b that bearings are received in the respective receiving area 54 on each side. These bearings also serve to position components for the axle. In addition, both ends of the connection support are at a different height from the omega profile, so that the ends of the support beam 28 and thus the end E2 of the integral support 10 is arranged above the omega profile in the vertical direction of the vehicle. This means that an elevation difference in comparison to the omega profile is made possible by means of the connection support (support beam 28). Crash or impact energy can thereby be dissipated across two horizontal planes. In the front, upper area of the support beams 28, the support beams 28 are connected to each other via an integrated structure. The integrated structure is herein the front integral support crossmember 30, which is, for example, formed as a tube. The integral support crossmember 30 is tightly connected to the support beams 28, in particular by welding. Receiving areas on the connection supports for the integrated structure are preferably arranged as far towards the outside as possible and enable a large surface area connection of the integrated structure to the respective support beams 28, wherein respective areas are referred to with 70a, b in FIG. 2, in which the integral support crossmember 30 is attached to the support beams 28 tightly and preferably across a large area. The integral support crossmember 30, which is, for example, formed as a transverse tube, is not directly connected to the omega profile in itself, and is not at the same height as the omega profile. The operating principle of the integral support 10 is described in the following:

In the event of a frontal impact, a part of the crash energy is absorbed by both connection supports, in particular by the connection supports being deformed. Deformation energy can be applied across a large distance in the longitudinal direction of the vehicle by means of the described elevation difference. The second deformation possibility lies between the central abutments 66a, b and the rear individual profiles 60e, f, for example formed as brackets, of the omega structure, also referred to as the omega frame. In this area, further energy is absorbed by the material, before the rigid structure with the fastening points to the neighbouring components starts to absorb energy. The respective support surfaces A1 and A2 on the two rear, in particular open ends of the omega profile or the leg 36 ensure advantageous crash behavior.

In the event of a frontal impact with little side impact, the integral support 10 has, on one hand, the task of absorbing energy, and on the other hand of reducing the impact area with the rigid obstacle by means of its shear stiffness and thus by means of a leverage effect in relation to the centre of gravity of the vehicle. These contradictory requirements can be solved as follows: an obstacle with little side impact on the passenger motor vehicle hits the ends of the front, integrated structure (integral support crossmember 30) at a diagonal angle. This ensures both the introduction of high lateral forces into the front integrated structure, in order to at least reduce the impact area of the passenger motor vehicle, and also the introduction of forces in the longitudinal direction, which lead to energy absorption in the connection supports. It is hereby very advantageous that the introduction of the lateral forces can be sustained across a long period of time, while the front diagonal structure is pushed backwards during the deformation of the connection supports. The integrated structure as well as the curved structure 26 hereby remain largely undeformed, in order to be able to maintain a high lateral level of force and thus a leverage effect in relation to the centre of gravity of the vehicle.

In the event of a pole crash, a barrier with a round outer periphery, for example, hits at least substantially the centre of the integral support crossmember 30. In such a pole crash, the front integrated structure is subjected to bending in a first step and absorbs energy. By means of the vertical attachment of the integral support 10 to the main longitudinal support, the shell of the bodywork structure is thereby additionally activated and the main longitudinal support is additionally used as an energy-absorbing structure by means of a bending element. The barrier moves further backwards during the pole crash. As a consequence, the connection supports are pulled backwards, whereby the front structure at least forms a V shape towards the back. Because the integrated front structure (integral support crossmember 30) is not fastened to the vertex 58 of the omega profile and is distanced from the vertex 58, and can thus freely move the front structure backwards, energy can already be absorbed before the barrier or the front, integrated structure hit the omega profile. If the pole and the front, integrated structure ultimately hit the omega profile, the load is distributed across the whole omega profile. The remaining energy is finally absorbed by deformation of the omega profile or into the omega profile.

The invention claimed is:

1. A fastening arrangement for a passenger motor vehicle, comprising:
    an integral support (10), wherein the integral support (10) is fastened to longitudinal supports (14) of a body (12) of the passenger motor vehicle that are distanced from each other in a transverse direction of the passenger motor vehicle and are disposed above the integral support (10); and
    an electrical energy store (20) that is disposed behind the integral support (10) in a longitudinal direction of the passenger motor vehicle and that is disposed under a floor (24) of the body (12);
    wherein the integral support (10) has a step(S) on an end (E) that faces the electrical energy store (20), wherein an upper support surface (A1) and a lower support surface (A2) are formed by the step(S), wherein the upper support surface (A1) is disposed opposite a crossmember (32) of the body (12), which is disposed under the floor (24), in the longitudinal direction of the passenger motor vehicle, and wherein the lower support surface (A2) is disposed opposite a support element (22) of the electrical energy store (20), which is disposed under the floor (24), in the longitudinal direction of the passenger motor vehicle.

2. The fastening arrangement according to claim 1, wherein the lower support surface (A2) opposite the upper support surface (A1) is displaced towards a rear in the longitudinal direction of the passenger motor vehicle.

3. The fastening arrangement according to claim 1, wherein the integral support (10) is fastened to the crossmember (32) at a top the integral support (10) in a vertical direction of the passenger motor vehicle between the upper and lower support surfaces (A1, A2) in the longitudinal direction of the passenger motor vehicle.

4. The fastening arrangement according to claim 1, wherein the upper support surface (A1) directly adjoins the crossmember (32) towards a rear in the longitudinal direction of the passenger motor vehicle.

5. The fastening arrangement according to claim 1, wherein the lower support surface (A2) is distanced from the support element (22) in the longitudinal direction of the passenger motor vehicle and wherein the upper support surface (A1) is distanced from the crossmember (32).

6. The fastening arrangement according to claim 1, wherein the crossmember (32) is connected to side sills of the body (12) at respective ends and wherein the side sills are distanced from each other in the transverse direction of the passenger motor vehicle.

7. The fastening arrangement according to claim 6, wherein the support element (22) is connected to the side sills.

8. The fastening arrangement according to claim 1, wherein the fastening element (22) is fastened to the crossmember (32).

9. The fastening arrangement according to claim 1, wherein the integral support (10) has a curved structure (26) with two front support beams (28) which extend to a front of the curved structure (26) in the longitudinal direction of the passenger motor vehicle and extend away from each other and has a rear integral support crossmember (38) via which respective legs (36) of the curved structure (26) are connected to each other.

10. The fastening arrangement according to claim 1, wherein the two front support beams (28) are connected directly to the curved structure (26) via respective ends that face the curved structure (26).

11. A passenger motor vehicle, comprising:
the fastening arrangement according to claim 1.

* * * * *